Dec. 10, 1968    P. H. McGRATH    3,415,217

ANGULAR TURN INDICATOR

Filed April 17, 1967

INVENTOR.
PAUL H. McGRATH

BY
Kenway, Jenney & Hildreth
ATTORNEYS

United States Patent Office 3,415,217
Patented Dec. 10, 1968

3,415,217
ANGULAR TURN INDICATOR
Paul H. McGrath, 23 Harold St.,
Chelmsford, Mass. 01824
Filed Apr. 17, 1967, Ser. No. 642,273
3 Claims. (Cl. 116—115)

ABSTRACT OF THE DISCLOSURE

A simple indicator for indicating the extent of angular rotation about a horizontal axis of a rotatable member to which it is attached comprises a continuous helical channel wound circumferentially around the axis at a distance from it and extending longitudinally along it. A gravity-responsive indicator element such as a ball-bearing or a bubble in liquid moves axially in the channel as the indicator is rotated and it is compared with indicia associated with the channel to indicate the total angular rotation from a given starting point.

My invention relates to an angular turn indicator. In particular, it relates to an angular turn indicator of the mechanical type which provides a direct indication of the angle through which a rotatable member to which the indicator is attached is rotated.

Angular turn indicators have a wide variety of applications, both industrial and non-industrial, and are used whenever it is desired to measure the angular amount through which a rotatable member is being turned. A simple type of angular indicator consists of a calibrated dial mounted co-axially with a rotatable member whose angular rotation is to be measured. Such a device is adequate for measuring angular rotations up to 360° but must be supplimented by additional mechanism when the range of the indicator is to be extended beyond 360°. Prior mechanical indicators with full-scale ranges greater than 360° typically utilized a number of gears coupled to the rotatable member, the gears making a fixed number of revolutions for each revolution of the rotatable member. The output reading of indicators of this type was presented in either analog form in which one or more mechanical pointers rotating around a calibrated dial provided an indication of the total angular amount through which the member has been rotated, or in digital form, in which the output was given as a series of digital numbers indicating total and partial revolutions. Indicators of this type, while adequate in indicating the angular rotation of a rotatable member, were often prohibitively expensive and thus could not economically be applied to all of the numerous applications in which an indication of angular rotation would be convenient and desirable. Further, such indicators were often delicate in nature and, when attached to a rotatable shaft, often could not sustain the high torque required to turn the shaft.

I have found that a simple yet efficient angular turn indicator may be formed from a channel member mounted coaxially with the rotatable member and having a continuous spiral or helical channel formed internal thereto. An indicating member, such as a steel ball, is disposed within the channel, and this member is moved along the length of the channel under the influence of gravity a distance proportional to the angular rotation of the rotatable member. Thus the position of the indicator member along the length of the channel indicates the angular amount through which the channel member, and the rotatable member to which it is attached, is rotated.

Accordingly, it is an object of my invention to provide a simple and economical angular turn indicator. Another object of my invention is to provide an economical angular turn indicator of the mechanical type which is capable of indicating the total angle through which a rotary member to which said indicator is attached is rotated. Yet another object of my invention is to provide an angular turn indicator of the mechanical type which may readily be attached to a rotary shaft with a minimum of adaptation and which can sustain relatively high rotational torques without damage.

Other and further objects and features of my invention will appear below in the following detailed description of a preferred embodiment thereof which has been selected for purposes of illustration and which is shown in the accompanying drawings in which.

In accordance with my invention, I provide an angular turn indicator for indicating the total angle through which a rotatable member to which the device is attached is rotated. The indicator comprises a channel member containing a continuous channel and having a plurality of convolutions curved about a generally horizontal axis, and a gravity-responsive indicator means, such as a steel ball, a drop of mercury, or an air bubble in a liquid medium, which is placed within the channel and which is freely movable along the channel under the ifluence of gravity as the plate is turned coaxially with the rotatable member whose angular rotation is to be measured. In one embodiment of my invention the channel member comprises a planar disk containing the continuous channel in the form of a spiral curving outwardly from the center of the disk toward the periphery. The disk is mounted in a vertical plane and rotates with the rotatable member about a horizontal axis, the ball, air bubble, or other indicating element traveling along the spiral as the disk is turned in conjunction with the rotatable member. This embodiment of my invention provides a read out that is generally along a horizontal axis. In another embodiment of my invention, the channel member is of generally cylindrical shape and has a hollow passageway through its center for mounting coaxially with a rotatable member along a horizontal axis. A continuous helical channel is disposed near the periphery of the cylinder and contains an indicating member of the type described above which travels along the helical channel as the cylindrical plate is rotated. This embodiment of my invention provides an angular read out along an axis that is generally perpendicular to the horizontal mounting axis of the indicator.

Figure 1:
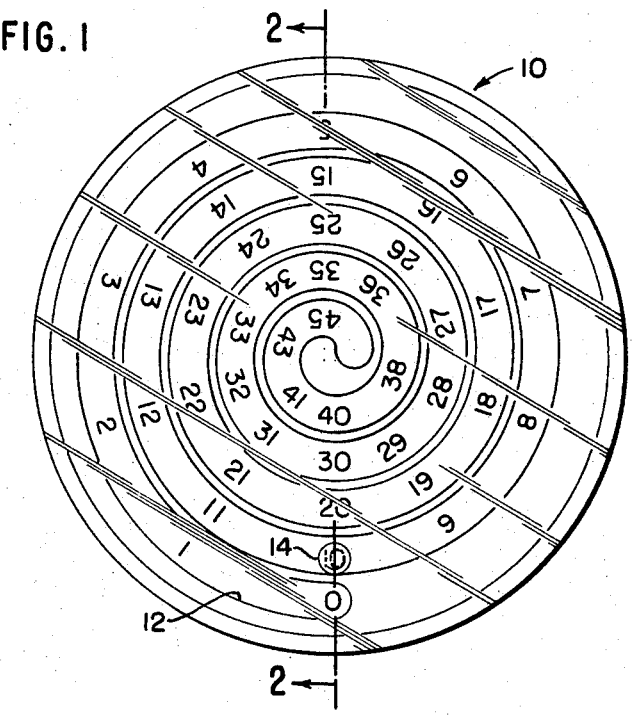
FIG. 1 is a plan view of one embodiment of my invention in which the angular rotation is read out along a generally horizontal axis.
Figure 2:
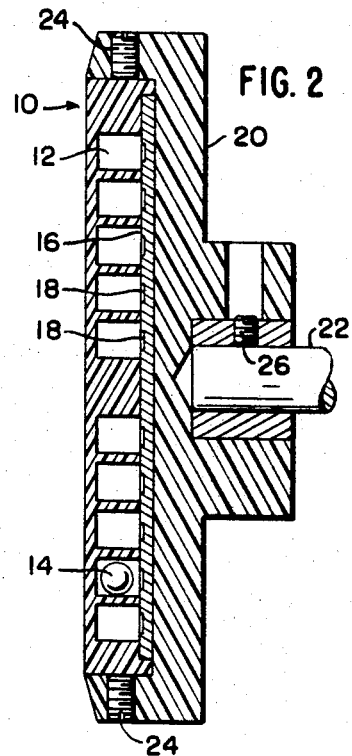
FIG. 2 is a side sectional view taken along the line 2—2 of FIG. 1 and showing the embodiment of FIG. 1 fixed in the handle of a rotatable shaft member.

FIG. 1 is a plane view, partially in section, of one embodiment of my invention which provides a read out along a generally horizontal axis. A disk 10 has a continuous spiral channel 12 formed therein, the channel extending outwardly from the center portion of the disk toward the periphery. The disk is formed from a transparent material such as Lucite in order to allow an unobstructed view of the channel 12. Disposed within the channel is an indicator member 14 which is free to travel along the channel under the influence of gravity as the disk is rotated. The indicator member is preferably formed from a relatively dense material structured to provide minimum friction with the walls of the channel. A smooth steel ball is adequate for this purpose, as is a relatively dense non-wetting substance such as mercury. For purposes of illustration, the indicating member is shown as a steel ball in FIG. 1. Mounted at the rear of the disk is a wall 16 having recessed portions 18 into which numerals of appropriate magnitude corresponding to varying amounts of angular rotation may be embossed or otherwise formed. These numerals may be seen clearly in FIG. 1 in which, for purposes of illustration, each 360° of rotation is shown divided into ten segments. Alternatively, the numerals may be formed on the upper face of the plate 10. The disk 10 and wall 16 may be mounted in the handle 20 of a rotatable member 22 by means of set screws 24 as shown in FIG. 2, the member 22 lying along a horizontal axis. The handle 20 is secured to the member 22 by means of a set screw 26.

The operation of the device is as follows: The zero point of the indicator is first set by rotating the disk 10 clockwise (thus moving the indicator member 14 counterclockwise with respect to the disk) until the indicator member has traveled along the groove to a position opposite the zero mark on the rear wall 16. The disk and wall are then set into the handle 20 with the zero mark located at any convenient position, for example, at the lowermost portion of a vertical axis. The disk 10 is then locked into the handle 20 by means of the set screws 24. As the shaft 22 and handle 20 are rotated in a counterclockwise direction, the indicating member 14 assumes a position which minimizes its gravitational potential energy and thus maintains itself at the lowest position along a given track of the channel. Thus, as the disk 10 is rotated with the handle 20, the indicator member 14 travels successively inwardly toward the center of the disk, the position of the member 14 along the channel as viewed along a horizontal axis indicating the angle through which the disk and shaft have been rotated. In effect, the disk and its associated indicator act as an angular integrator to total the angular rotations of the shaft.

As stated previously, the angular indicator shown in FIG. 1 provides a read out along a horizontal axis. In certain situations, it may be desirable to provide a read out along an axis that is perpendicular to the horizontal axis. For example, it is not uncommon in chemical plants to find valves which are mounted above the operator's head or, alternatively, quite close to the floor. In such situations, it is both inconvenient and awkward to position oneself directly in front of the valve handle so that a horizontal reading of the angular indicator may be made. An angular indicating device which would allow a reading to be made along a vertical axis whereby the operator is able to look straight up from below the indicator or straight down from above it would be both convenient and desirable.

Figure 3:
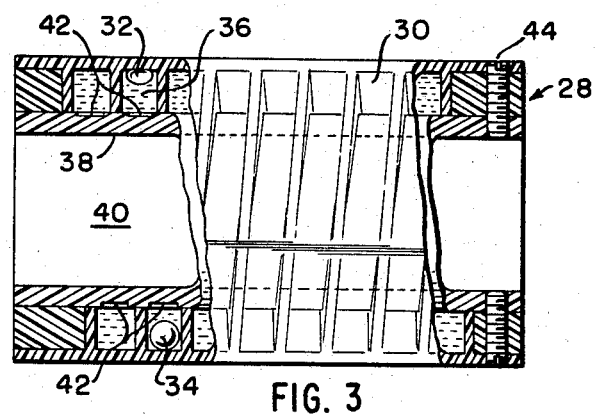
FIG. 3 is a side view, partially in section, of another embodiment of my invention in which the angular rotation is read out along a generally vertical axis.
Figure 4:
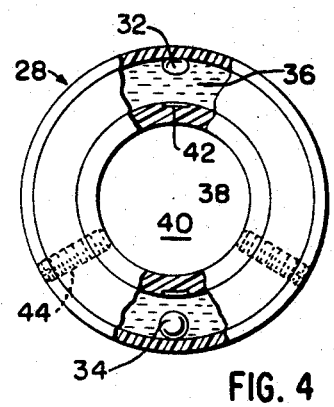
FIG. 4 is an end view, partially in section, of the embodiment of my invention illustrated in FIG. 3.

An indicator of this type, which is another embodiment of my invention, is shown in FIGS. 3 and 4. As shown therein, a cylindrical element 28 has a continuous helical channel 30 formed therein near the periphery thereof, the channel containing indicator members 32 and 34. The indicator member 32 may comprise an air bubble trapped in a liquid 36 which fills substantially the entire channel, while the indicator member 34 comprises a dense, smoothly shaped material such as a steel ball. Firmly attached to the cylinder 28 and in liquid-tight engagement therewith is a cylindrical sealing wall 38 having an extended central passage 40 through its center. Recesses 42 are provided in the wall 38 in positions corresponding to discrete segments of the channel. As was the case with the recesses 18 of FIG. 2, indicia comprising numerals of appropriate magnitude may be imprinted in these recesses at periodic intervals to indicate successive increments of angular rotation. Alternatively, the numerals or other desired indicia may be provided at other convenient locations. A shaft (not shown) whose angular rotation is to be measured is inserted in the central passageway 40 and the indicator is securely fastened to this shaft by means of set screws 44.

The operation of the indicator shown in FIGS. 3 and 4 is as follows: Assuming that the channel 30 of the indicator has a right-hand helical thread when viewed from the right-hand end and that the indicator member 32 has a zero position at the extreme right end of the helical channel, rotation of the indicator 28 in a counterclockwise direction about a horizontal axis will cause the bubble 32 to move progressively along the channel from right to left as the indicator is rotated. The position of the bubble along the channel will provide a direct indication of the total amount through which the indicator, and thus the rotary shaft to which the indicator has been attached, has been rotated. Since the liquid 36 at all times assumes a position which minimizes its gravitational energy, the bubble 32 will remain at all times in the uppermost portion of the channel 30. Thus, the position of this bubble as viewed along an axis perpendicular to the horizontal axis and from above will provide a direct indication of the total angular rotation of the indicator. The indicator member 34 operates in a similar fashion, with the exception that this member remains at the bottom of the channel at all times and thus is read from below along an axis perpendicular to the horizontal axis.

As shown in FIGS. 1 through 4, the channel members of my invention have been illustrated as being formed from a piece of solid transparent material such as Lucite having a continuous spiral or helical channel formed within the member. Such a construction readily lends itself to mass manufacture in which the individual channel members may be stamped, molded, or otherwise formed, in large quantities in a relatively short time. It will be apparent, however, that other methods of manufacture may prove equally desirable and it is not intended to limit my invention to the specific form shown. Thus, for example, a flexible tubing may be spirally coiled to form a disk of the type shown in FIG. 1, the disk being sealed to a back plate containing numeral's marking various positions along the length of the chanel. A similar construction may be adopted for the indicator illustrated within FIGS. 3 and 4, the tubing being wound in this case about a cylindrical base piece. Further, the indicator shown in FIG. 1 will operate effectively with a liquid filled channel containing an air bubble as shown in FIG. 3, while the construction shown in FIG. 3 will also operate with the liquid and air bubble alone or with the steel ball alone. Further, it will be apparent that the indicator shown in FIG. 1 may be mounted directly on a rotary shaft member by providing a central opening through the center of the disk through which the shaft can be fitted, the opening preferably having an extended boss or flange surrounding it such that the indicator may be secured to the shaft by means of set screws extending through the boss and pressing against the shaft. Various other modifications will suggest themselves to those skilled in the art without departing from the scope of my invention.

From the above it may be seen that I have provided a simple yet economical angular turn indicator. Further, I have provided an angular turn indicator of the mechanical type which dispenses with the need for mechanical gears when a plurality of revolutions are to be indicated. In addition, I have provided an angular indicator of the mechanical type which is capable of indicating the total angle through which a rotary member to which the indicator is attached is rotated and which can sustain high rotational torques without damage.

It will thus be seen that the objects set forth above, among those made apparent from the preceding description, are efficiently attained and, since certain changes may be made in the above constructions without departing from the scope of the invention, it is intended that all matter contained in the above description and shown in the accompanying drawings shall be interpreted as illustrative and not in a limiting sense.

It is also to be understood that the following claims are intended to cover all the generic and specific features of the invention herein described and all statements of the scope of the invention which, as a matter of language, might be said to fall therebetween.

Having described my invention, I claim:

1. An angular turn indicator device comprising an elongated rotatable member mounted for rotation about a horizontally-extending axis, tubular means forming a continuous helical channel member of light transmitting material concentrically and fixedly mounted on said rotatable member, said helical channel member extending both circumferentially and axially with respect to said rotatable member, position indicating indicia associated with said helical channel member at angular intervals along said channel member, a gravity-responsive indicator element disposed within said helical channel member and guided thereby for movement within said channel member as said rotatable member is rotated, the position of said indicator element along the length of said channel member with respect to said indicia being determined by the rotation of said rotatable member about said axis and providing a direct indication of the angle through which said rotatable member has been rotated when said axis is disposed in a horizontal position.

2. The combination defined in claim 1 in which said indicator element comprises a relatively dense member movable within said helical tubular member under the influence of gravity as said rotatable member is rotated.

3. The combination defined in claim 1 in which said indicator element comprises a member of relatively low density movable within said channel under the influence of bouyancy as said rotatable member is rotated.

References Cited

UNITED STATES PATENTS

| | | | |
|---|---|---|---|
| 467,676 | 1/1892 | Schneider | 273—120 |
| 1,450,919 | 4/1923 | Harris. | |
| 1,564,132 | 12/1925 | France | 46—43 |
| 2,045,985 | 6/1936 | Franz | 338—147 |
| 2,141,770 | 12/1938 | Solomon | 338—147 |
| 2,486,587 | 11/1949 | Callahan et al. | 338—196 |
| 2,558,326 | 6/1951 | Van Dyke | 338—149 |
| 2,752,725 | 7/1956 | Unsworth | 35—19 |
| 2,798,321 | 7/1957 | Duff | 40—68 |
| 2,828,562 | 4/1958 | Warren | 40—68 |
| 2,859,725 | 11/1958 | Genasci | 116—124 |
| 2,866,053 | 12/1958 | Bourns. | |
| 2,887,353 | 5/1959 | Barstrom et al. | 346—101 |
| 3,028,704 | 4/1962 | Rumbaugh | 273—112 |

FOREIGN PATENTS

| | | |
|---|---|---|
| 15,795 | 10/1903 | Austria. |
| 532,931 | 11/1954 | Belgium. |

LOUIS J. CAPOZI, *Primary Examiner.*

U.S. Cl. X.R.

74—813